(12) United States Patent
Wang et al.

(10) Patent No.: US 7,124,414 B2
(45) Date of Patent: Oct. 17, 2006

(54) METHOD, SYSTEM AND PROGRAM PRODUCT FOR ROUTING REQUESTS IN A DISTRIBUTED SYSTEM

(75) Inventors: Ping Wang, Austin, TX (US); Leigh A. Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 10/286,585

(22) Filed: Oct. 31, 2002

(65) Prior Publication Data

US 2004/0088714 A1 May 6, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/313; 709/238
(58) Field of Classification Search ................ 709/223, 709/238, 245; 719/310–320, 328–330
See application file for complete search history.

(56) References Cited

U.S. PATENT DOCUMENTS

| | | | | |
|---|---|---|---|---|
| 5,396,630 A | * | 3/1995 | Banda et al. ............... | 719/316 |
| 5,680,461 A | * | 10/1997 | McManis ..................... | 713/162 |
| 6,253,252 B1 | * | 6/2001 | Schofield ..................... | 719/315 |
| 6,466,991 B1 | * | 10/2002 | Moriyama et al. .......... | 719/315 |
| 6,687,761 B1 | * | 2/2004 | Collins et al. .............. | 719/315 |

OTHER PUBLICATIONS

Morgan, Corba meets Java, Java World, Oct. 1997, pp. 1-10.*

* cited by examiner

*Primary Examiner*—William Thomson
*Assistant Examiner*—Diem Cao
(74) *Attorney, Agent, or Firm*—Mark Walker; Hoffman, Warnick & D'Alessandro

(57) ABSTRACT

The present invention routes object requests in a distributed system using address information identified in object headers that accompany the request. Specifically, when an object is created under the present invention, address information is inserted into a corresponding object header. When a request related to the object is later issued, the object header accompanies the request. The address information is used to ensure that the request is efficiently and accurately routed to a target process within a target node of a target cell.

17 Claims, 4 Drawing Sheets

METHOD, SYSTEM AND PROGRAM PRODUCT FOR ROUTING REQUESTS IN A DISTRIBUTED SYSTEM

BACKGROUND OF THE INVENTION

1. Field of the Invention

The present invention generally relates to a method, system and program product for routing requests in a distributed system. Specifically, the present invention routes object requests to the applicable processes based on address information that is provided within object headers that accompany the requests.

2. Background Art

As electronic commerce grows, business are increasingly implementing complex websites to foster growth and profitably. To develop and deploy integrated websites, developers often rely on software products such as WEBSPHERE, which is commercially available from International Business Machines Corp. of Armonk, N.Y. Although products such as WEBSPHERE are powerful tools in providing complete electronic business solutions to customers, they are generally distributed, multi-process systems. This can complicate its interaction with other popular systems such as JAVA MANAGEMENT EXTENSIONS (JMX). Specifically, JMX is a package addition to the Java 2 Platform, standard edition (J2SE) that provides management and monitoring services for web-based solutions. Unfortunately, the JMX Java Management Framework specification does not include provisions for distributing requests (e.g., JAVA object management requests) from one process (e.g., Java Virtual machine) to another. Thus, when dealing with a distributed system where several processes can reside over one or more nodes, the routing of such requests can become complicated.

For example, if an object management request bound for target process "A" within target node "2" is first received on node "1," there is currently no efficient way to route the request to target process "A" within target node "2." Under one approach, a global registry is maintained that tracks all objects and requests. However, when a management request is made corresponding to a particular object, the registry must be consulted to obtain the object's address information. Such a requirement not only requires constant updating of the global registry, but is also highly inefficient.

In view of the foregoing, there exists a need for a method, system and program product for routing requests in a distributed system. Specifically, a need exists for address information to accompany requests (e.g., object management requests) for efficient routing to the target destination. Still yet, a need exists for the address information to be included in an object header that corresponds to the object that is the target of the request. A further need exists for the address information to be inserted into the object header as the object is being created, or at least before the object is implemented.

SUMMARY OF THE INVENTION

In general, the present invention provides a method, system and program product for routing requests in a distributed system. Specifically, under the present invention a request pertaining to a target object is routed to a target process (e.g., a JAVA virtual machine) based on address information. The address information is contained within an object header that corresponds to the target object and that accompanies the request. Typically, the address information identifies a target cell, a target node within the target cell, and the target process within the target node. In addition, the address information can identify a target object type and name. Under the present invention, the address information is typically inserted into the object header as the corresponding target object is being created, or at least before the target object is implemented. Based on the address information in the object header, the request can be efficiently routed within the distributed system to the target process. Once received by the target process, an external management program (e.g., JMX) can utilize the target object type and name within the object header (if provided) to identify the specific target object and implement the request.

According to a first aspect of the present invention, a method for routing requests in a distributed system is provided. The method comprises: (1) providing an object handle for a target object, wherein the object handle includes address information that identifies a target cell, a target node and a target process of the target object; and (2) routing a request corresponding to the target object to the target process using the address information within the object handle.

According to a second aspect of the present invention, a system for routing requests in a distributed system is provided. The system comprises: (1) a reception system for receiving a request and an object handle corresponding to a target object on a particular node in the distributed system, wherein the object handle includes address information that identifies a target cell, a target node and a target process of the target object; and (2) a routing system for routing the request and the object handle to the target process within the target node of the target cell based on the address information.

According to a third aspect of the present invention, a program product stored on a recordable medium for routing requests in a distributed system is provided. When executed, the program product comprises: (1) program code for receiving a request and an object handle corresponding to a target object on a particular node in the distributed system, wherein the object handle includes address information that identifies a target cell, a target node and a target process of the target object; and (2) program code for routing the request and the object handle to the target process within the target node of the target cell based on the address information.

According to a fourth aspect of the present invention, a method for inserting address information corresponding to a target object into an object handle is provided. The method comprises: (1) generating a target object and a corresponding object handle; and (2) inserting the address information into the object handle before the target object is implemented, wherein the address information identifies a target cell, a target node and a target process of the target object.

According to a fifth aspect of the present invention, a system for inserting address information corresponding to a target object into an object handle is provided. The system comprises: (1) a generation system for generating a target object and a corresponding object handle; and (2) an insertion system for inserting the address information into the object handle before the target object is implemented, wherein the address information identifies a target cell, a target node and a target process of the target object.

According to a sixth aspect of the present invention, a program product stored on a recordable medium for inserting address information corresponding to a target object into an object handle is provided. When executed, the program product comprises: (1) program code for generating a target object and a corresponding object handle; and (2) program code for inserting the address information into the object handle before the target object is implemented, wherein the address information identifies a target cell, a target node and a target process of the target object.

Therefore, the present invention provides a method, system and program product for routing requests in a distributed system. The present invention also provides a method, system and program product for inserting address information corresponding to a target object into an object handle.

BRIEF DESCRIPTION OF THE DRAWINGS

These and other features of this invention will be more readily understood from the following detailed description of the various aspects of the invention taken in conjunction with the accompanying drawings in which.

Figure 1:
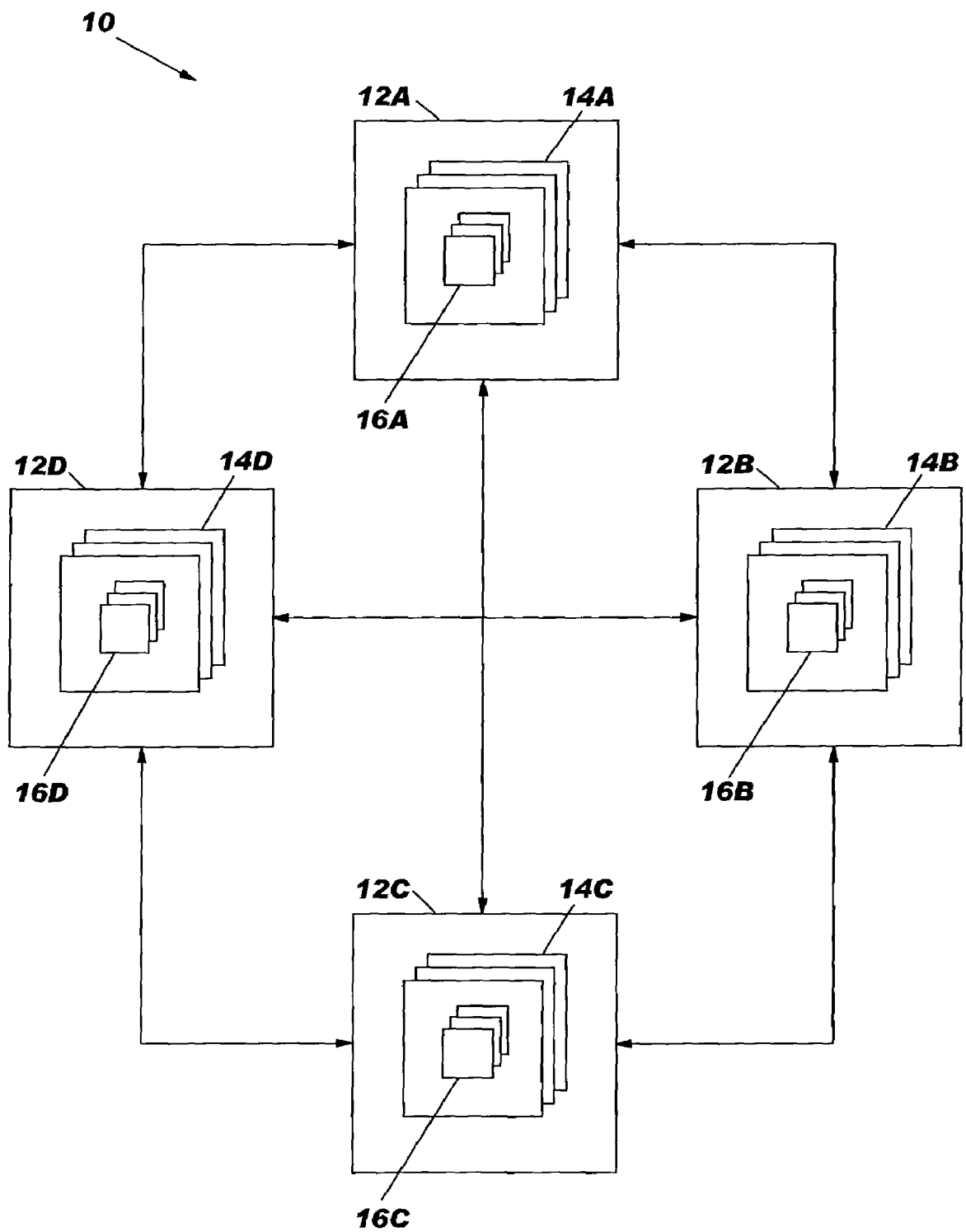
FIG. 1 depicts a distributed system of nodes according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for routing requests in a distributed system. Specifically, under the present invention a request pertaining to a target object is routed to a target process (e.g., a JAVA virtual machine) based on address information. The address information is contained within an object header that corresponds to the target object and that accompanies the request. Typically, the address information identifies a target cell, a target node within the target cell, and the target process within the target node. In addition, the address information can identify a target object type and name. Under the present invention, the address information is typically inserted into the object header as the corresponding target object is being created, or at least before the target object is implemented. Based on the address information in the object header, the request can be efficiently routed within the distributed system to the target process. Once received by the target process, an external management program (e.g., JMX) can utilize the target object type and name within the object header (if provided ) to identify the specific target object and implement the request.

It should be understood that although the present invention typically applies to the routing of requests corresponding to target JAVA objects, the teachings described herein could be applied to request routing for any type of target. Moreover, it should be understood that although the request is typically an object management request (i.e., calling for some maintenance or administration of a target object), the request could be made for any reason.

Referring now to FIG. 1 a block diagram of a set of nodes 12A–D arranged in a distributed system 10 is shown. As depicted, each node 12A–D in distributed system 10 is able to communicate both directly or indirectly with each other (although this need not be the case for the teachings of the present invention to be utilized). In addition, it should be understood that within distributed system 10, a subset of nodes 12A–D could be arranged into cells. For example, nodes 12A–B could represent one cell, while nodes 12C–D represent another cell. As used herein, each node 12A–D is intended to represent at least one computerized system (e.g., workstation, laptop, personal digital assistant, etc.). Moreover, as shown, one or more of nodes 12A–D can include one or more processes 14A–D and/or objects 16A–D. In a typical embodiment, processes 14A–D are virtual machines (e.g., JAVA virtual machines (JVMs)) and objects 16A–D are JAVA objects (although this need not be the case). As known in the art, a JVM is software that acts as an intermediary between compiler JAVA binary code and the microprocessor (i.e., hardware platform) that actually performs the instructions. A JVM allows an application program to be built to run on any platform without having to be rewritten or recompiled. A JAVA object is a specific instance of a particular JAVA class. In general, a JAVA object includes data (i.e., instance fields) that is operated on by procedures (i.e., methods).

As indicated above, if a request to perform some operation (e.g., an object management request) on a target object is received by a particular node 12A–D, the request might have to be routed to the appropriate destination. As such, routing the request could entail ensuring that the request is routed to the target cell, to the target node within the target cell, and then to the target processes within the target node. Thus, routing could be complicated by the fact that any one distributed system 10 could include several cells of nodes that each have multiple processes. For example, even if the request is routed to the correct node, the request could still have to be routed within that node to the appropriate process. The present invention addresses these issues.

Figure 2:
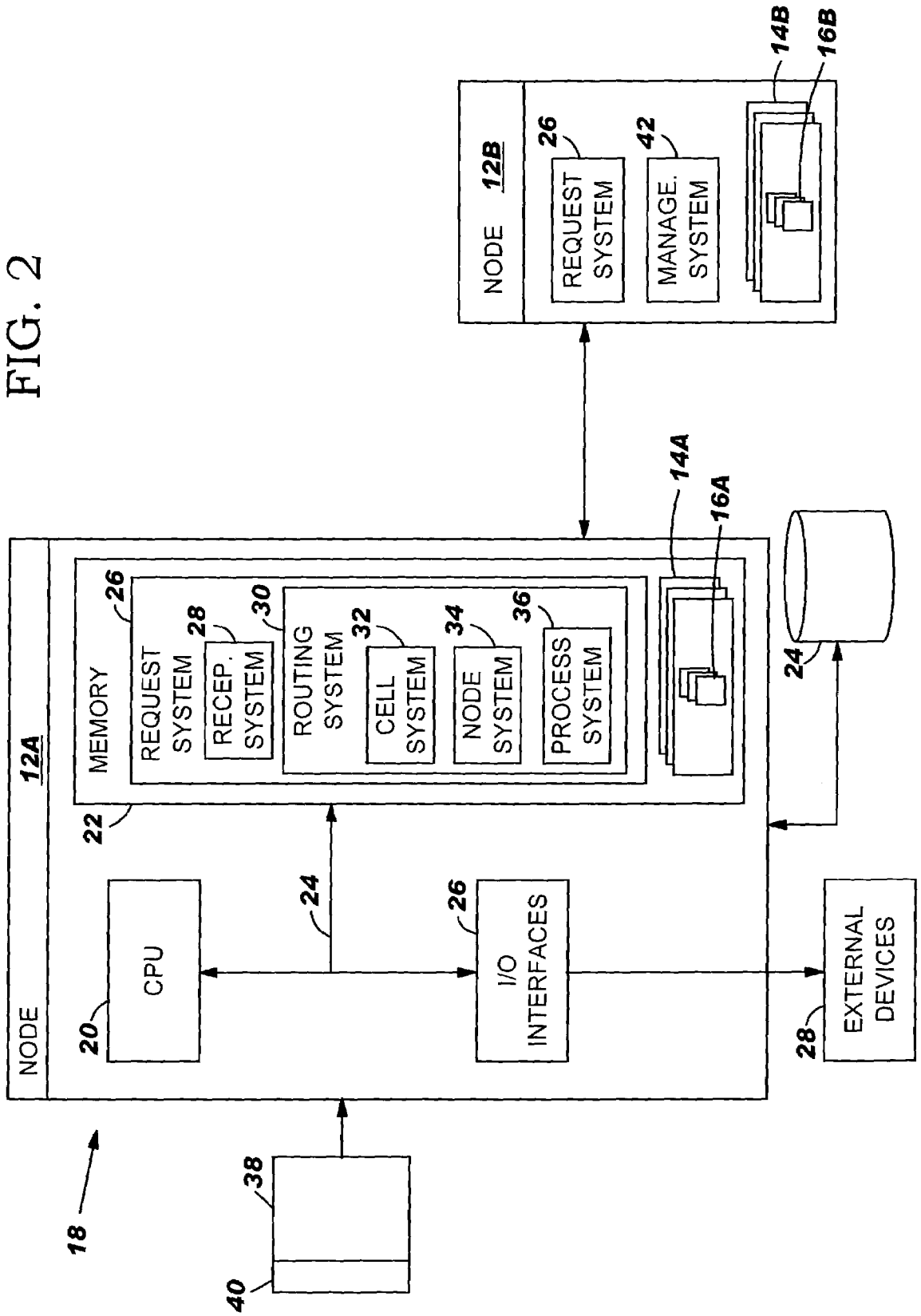
FIG. 2 depicts a cell of nodes of the distributed system of FIG. 1 having a request system for routing a request.

Referring now to FIG. 2, a more detailed depiction of the present invention is shown. Specifically, FIG. 2 depicts request 38 corresponding to target object 16B being received by node 12A for routing to target process 14B within target node 12B. For exemplary purposes, it will be assumed that nodes 12A–B are part of cell 18.

As shown, node 12A generally includes central processing unit (CPU) 20, memory 22, bus 24, input/output (I/O) interfaces 26 and external devices/resources 28. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor, facsimile, pager, etc. Bus 24 provides a communication link between each of the components in node 12A and likewise may comprise any known type of transmission link, including electrical, optical, wireless, etc. In addition, although not shown, additional components, such as cache memory, communication systems, system software, etc., may be incorporated into node 12A.

Database 24 is optional and could provide storage for information under the present invention. Such information could include, for example, requests, objects, etc. As such, database 24 may include one or more storage devices, such as a magnetic disk drive or an optical disk drive. In another embodiment, database 24 includes data distributed across, for example, a local area network (LAN), wide area network (WAN) or a storage area network (SAN) (not shown). Database 24 may also be configured in such a way that one of ordinary skill in the art may interpret it to include one or more storage devices.

It should be understood that communication among nodes 12A–B (as well as among all nodes 12A–D) can occur via a direct hardwired connection (e.g., serial port), or via an addressable connection in a client-server (or server-server) environment. In the case of the latter, the server and client may be connected via the Internet, a wide area network (WAN), a local area network (LAN), a virtual private network (VPN) or other private network. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server. It should also be understood that although not shown for brevity purposes, nodes 12B–D typically include computerized components (e.g., CPU, memory, database, etc.) similar to node 12A.

In general, request 38 is received by node 12A along with object header 40 that corresponds to target object 16B. Under the present invention, address information is contained within object header 40 and is used by request system 26 to route request 38 to the appropriate target process 14B. Typically, the address information identifies the target cell 18, the target node 12B and the target process 14B of request 38. Moreover, the address information could optionally include a target object type (e.g., category of object) and a target object name (particular instance of object). This optional information can be used to locate target object 16B and implement request 38 once request 38 is received by target process 14B. In general, the address information is inserted into object header 40 as one or more "tags" as the target object 16B is being created. For example, when a programmer is creating target object 16B, a system could be provided that automatically inserts the address information into the object header 40 that corresponds to target object 16B.

Figure 3:
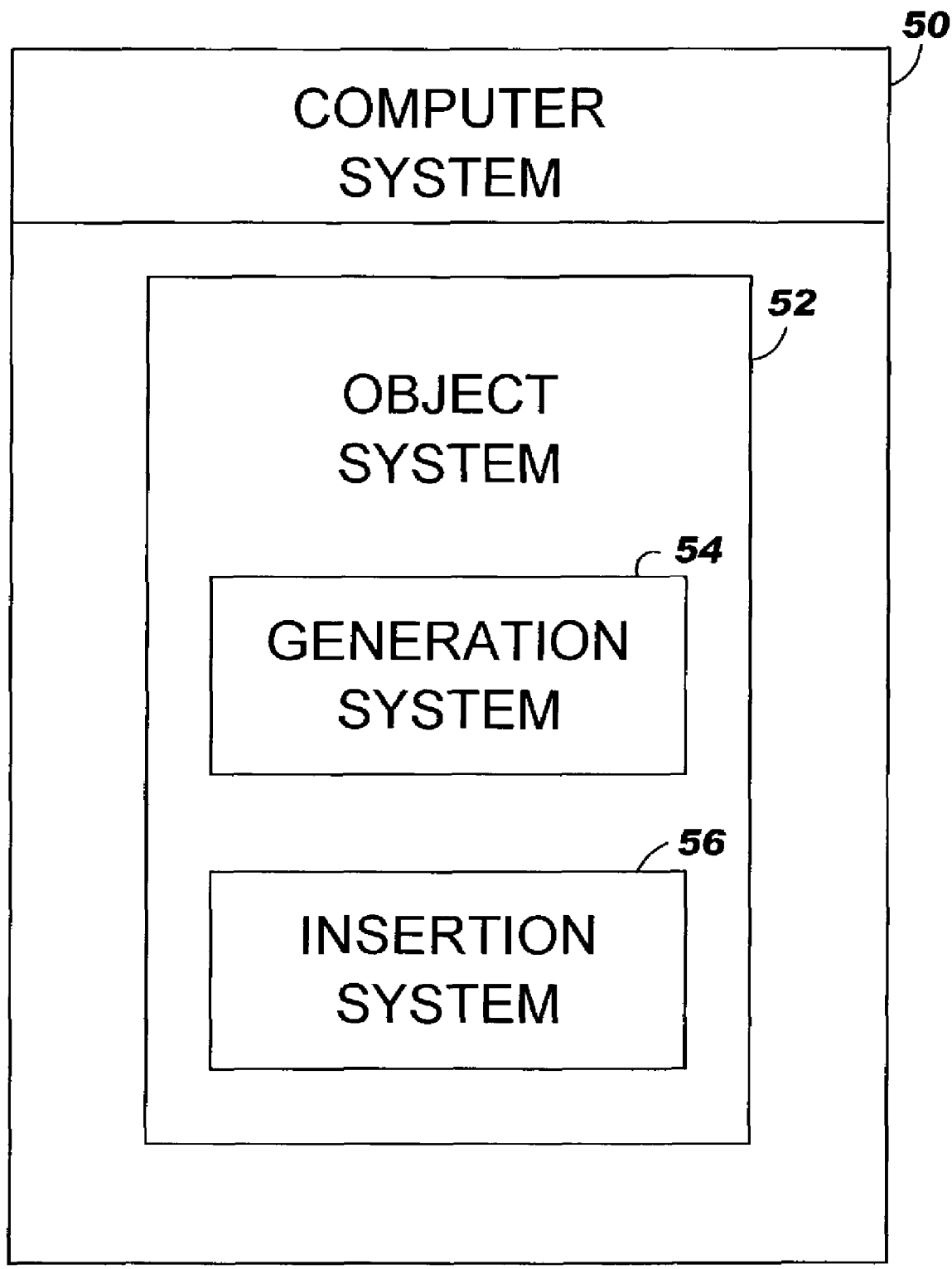
FIG. 3 depicts a computer system having an object system for inserting address information into an object header.

Referring to FIG. 3, an object system 52 that provides this functionality is shown in block diagram format. Specifically, object system 52 is typically loaded on any computer system 50 that is used by a programmer to create objects. In general, object system 52 includes generation system 54 and insertion system 56. Generation system 54 could be part of (or could interact with) any known software program that is used (directly or indirectly) to create objects (e.g., WEB-SPHERE). In any event, as the object is being created, or at least prior to its implementation, insertion system 56 will automatically insert the corresponding address information described above into the corresponding object header. For example, if the object is "run" by process 14B within node 12B of cell 18, this information will be contained within the object as potential target address information. Thus, the programmer need not be concerned with manually inputting the information into the object header (although he/she could choose to do so). Although not, shown, computer system 50 is understood to include computerized components similar to those shown and described in conjunction with node 12A of FIG. 2.

Referring back to FIG. 2, once object header 40 includes the necessary address information, it can be routed (e.g., either attached or as separate components) with request 38 to node 12A where it is received by reception system 28 (e.g., a node agent). Once received, the address information within object header 40 will be used by routing system 30 to route request 38 to target process 14B. Specifically, routing system includes cell system 32, node system 34 and process system 36. When request 38 is received, cell system 32 will first determine whether node 12A is part of the target cell (e.g., cell 18) identified in the address information. This is accomplished by comparing the identification of the cell to which node 12A belongs to the target cell identified in object header 40. If node 12A's cell identification does not match that set forth in object header 40, cell system 32 will forward request 38 and object header 40 to the correct target cell 18. If, however, node 12A is part of target cell 18, node system 34 will then determine whether node 12A is the target node (e.g., node 12B) identified in the address information. Similar to target cell verification, this is accomplished by comparing an identification of node 12A to that of target node 12B as identified in the address information. If node 12A is the target node, process system 36 would then route the request to the target process within node 12A. However, in this example the target node is node 12B, not node 12A. Accordingly, node system 34 will route request 38 and object header 40 to node 12B. As will be further described below, routing request 38 between nodes 12A–D could involve invoking proxies. In any event, upon receipt, request system 26 within node 12B will perform the same analysis. Specifically, request system 26 will verify that node 12B's cell is the target cell, and that node 12B is the target node identified in object header 40. Once this occurs, process system (not shown in node 12B) within request system 26 will determine whether the target process (e.g., process 14B) has received request 38. If not, process system within request system 26 of node 12B will route request 38 thereto. Once received by the target process, a management system (e.g., JMX) 42 can use the other address information (e.g., object type and name) to identify the particular target object 16B and implement request 38.

Figure 4:
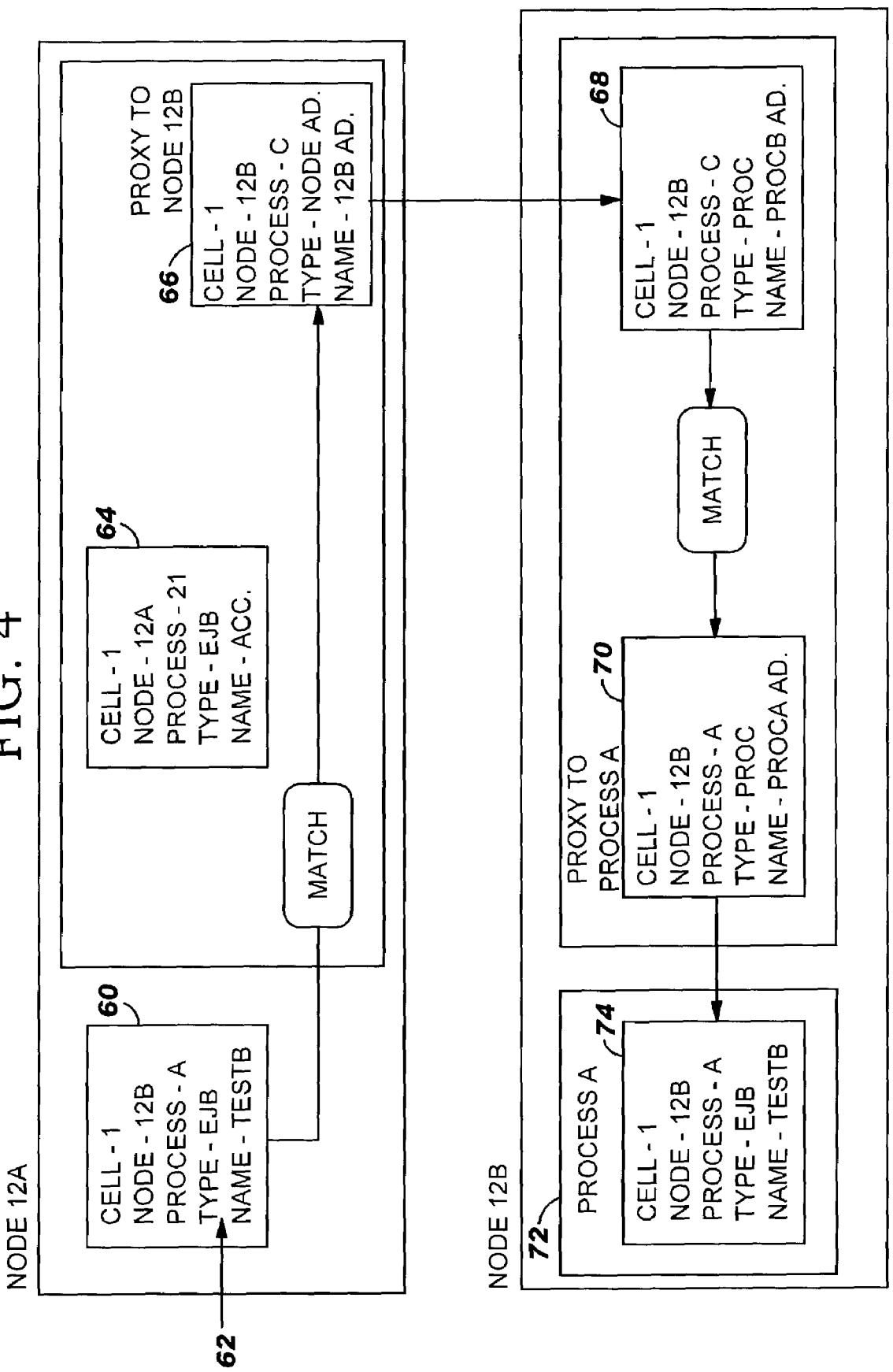
FIG. 4 depicts a flow diagram of a request being routed to a target process.

Referring now to FIG. 4, a more detailed block-flow diagram describing the routing of a request and object header from node 12A to node 12B is shown. As depicted in block 60, the object header received by node 12A that accompanies the request includes address information 62, which identifies a target cell, a target node, a target process, a target object type and a target object name. When received with the request, the object header is examined to ensure the request is routed appropriately. As indicated above, the first step performed by node 12A is to determine whether the request has been received by the correct cell. To do this, the cell system of the request system will compare the target cell identified in address information 62 to a cell identification corresponding to node 12A. As shown in block 64, node 12A is part of cell "1," which is the target cell identified in address information 62. Once the target cell has been confirmed, node 12A will compare the target node identified in address information 62 to its own node identification. In comparing the information in block 64 to address information 62, it can be seen that node 12A is not the target node, rather, node 12B is the target node. Accordingly, the request and object header must be routed to node 12B. As indicated above, routing of a request and/or object header between nodes can be accomplished in any known manner. In one embodiment, node 12A can call proxy 66 to node 12B. As shown, proxy 66 routes information to process "C" of node 12B. Thus, when the request and object header are routed by proxy 66, they will be received by process "C" of node 12B, as shown in block 68. Once received, node 12B will repeat the process to confirm that the request and object header are in the correct target cell and node. Once the target cell and target node have been confirmed, node 12B must now route the request and object header to the target process. That is, by comparing the target process identified in address information 62 (i.e., process "A") with the identification of the process that received the communication from node 12A (i.e., process "C"), node 12B will determine that the request and object header must be forwarded. Accordingly, the process system within the request system of node 12B will perform a lookup to find target process 72. Once target process 72 is found, the request and object header will be routed thereto. As demonstrated by comparing block 74 to block 60, the request has been received by the target process within the target node of the target cell. At this point a management program such as JMX can utilize the target object type and target object name in address information 62 to find the particular target object of interest and implement the request.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls nodes 12A–D and/or computer system 50 such that they carry out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A method for routing requests in a distributed system, comprising:

providing an object handle for a target object, wherein the object handle includes address information that identifies a target cell, a target node and a target process of the target object; and routing a request corresponding to the target object to the target process using the address information within the object handle, wherein the target process is in an external management program system, wherein the routing step comprises:

receiving the object handle and a request corresponding to the target object on a particular node in the distributed system;

routing the request to the target process of the target node within the target cell using the address information;

determining whether the particular node is part of the target cell by comparing the address information to a cell identification of the particular node, and routing the request and the object handle to the target cell if the particular node is not part of the target cell;

determining whether the particular node is the target node by comparing the address information to a node identification of the particular node, and routing the request and the object handle to the target node if the particular node is not the target node; and determining whether the request and the object handle have been received by the target process within the target node by examining the address information in the received object handle, and routing the request and the object handle to the target process if the request and the object handle have not been received by the target process.

2. The method of claim 1, wherein the address information further comprises a target object type and a target object name.

3. The method of claim 2, further comprising:

locating the target object within the target process using the target object type and the target object name without consulting a registry; and implementing the request on the target object.

4. The method of claim 1, wherein the providing step comprises:

creating a target object and a corresponding object handle; and inserting the address information into the object handle before the target object is implemented.

5. The method of claim 1, wherein the routing step comprises:

routing a request and the object handle to the target cell based upon the address information;

routing the request and the object handle to the target node within the target cell based upon the address information, after routing the request and the object handle to the target cell; and routing the request and the object handle to the target process within the target node based on the address information, after routing the request and the object handle to the target node.

6. The method of claim 1, wherein the address information is embodied within the object handle as one or more tags.

7. The method of claim 1, wherein the target process comprises a virtual machine in a Java Management Extensions system.

8. A system for routing requests in a distributed system, comprising:

a reception system for receiving a request and an object handle corresponding to a target object on a particular node in the distributed system, wherein the object handle includes address information that identifies a target cell, a target node and a target process of the target object; and a routing system for routing the request and the object handle to the target process within the target node of the target cell based on the address information, wherein the target process is in an external management program system, wherein the routing system comprises:

a cell system for determining whether the particular node is part of the target cell based on the address information, and for routing the request and the object handle to the target cell if the particular node is not part of the target cell;

a node system for determining whether the particular node is the target node based on the address information, and for routing the request and the object handle to the target node if the particular node is not the target node; and a process system for determining whether the request and the object handle have been received by the target process within the target node based on the address information, and routing the request and the object handle to the target process if the request and the object handle have not been received by the target process.

9. The system of claim 8, wherein the address information further comprises a target object type and a target object name.

10. The system of claim 9, further comprising a management system for locating the target object within the target process using the target object type and the target object name without consulting a registry, and for implementing the request on the target object.

11. The system of claim 8, wherein the address information is inserted into the object handle before the target object is implemented, and wherein the address information is embodied in the object handle as one or more tags.

12. The system of claim 8, wherein the target process comprises a virtual machine in a Java Management Extensions system.

13. A program product stored on a recordable medium for routing requests in a distributed system, which when executed comprises:

program code for receiving a request and an object handle corresponding to a target object on a particular node in the distributed system, wherein the object handle includes address information that identifies a target cell, a target node and a target process of the target object; and program code for routing the request and the object handle to the target process within the target node of the target cell based on the address information, wherein the target process is in an external management program system, wherein the program code for routing comprises:

program code for determining whether the particular node is part of the target cell based on the address information, and for routing the request and the object handle to the target cell if the particular node is not part of the target cell;

program code for determining whether the particular node is the target node based on the address information, and for routing the request and the object handle to the target node if the particular node is not the target node; and program code for determining whether the request and the object handle have been received by the target process within the target node based on the address information, and routing the request and the object handle to the target process if the request and the object handle have not been received by the target process.

14. The program product of claim 13, wherein the address information further comprises a target object type and a target object name.

15. The program product of claim 14, further comprising program code for locating the target object within the target process using the target object type and the target object name, and for implementing the request on the target object without consulting a registry.

16. The program product of claim 13, wherein the address information is inserted into the object handle before the target object is implemented, and wherein the address information is embodied in the object handle as one or more tags.

17. The program product of claim 13, wherein the target process comprises a virtual machine in a Java Management Extensions system.

* * * * *